United States Patent
Sasaki

(10) Patent No.: US 8,379,973 B2
(45) Date of Patent: Feb. 19, 2013

(54) COLOR PROCESSING APPARATUS AND COMPUTER-READABLE MEDIUM STORING COLOR PROCESSING PROGRAM

(75) Inventor: Makoto Sasaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 310 days.

(21) Appl. No.: 12/869,231

(22) Filed: Aug. 26, 2010

(65) Prior Publication Data

US 2011/0182506 A1    Jul. 28, 2011

(30) Foreign Application Priority Data

Jan. 22, 2010 (JP) ................. 2010-012378

(51) Int. Cl.
*G06K 9/00* (2006.01)
(52) U.S. Cl. ........................................ 382/162
(58) Field of Classification Search .......... 382/162, 382/167, 274; 358/500, 515, 518–521
See application file for complete search history.

(56) References Cited

U.S. PATENT DOCUMENTS 6,434,268 B1 * 8/2002 Asamura et al. ............. 382/162
2002/0168103 A1 * 11/2002 Shiraiwa ...................... 382/167

FOREIGN PATENT DOCUMENTS

| JP | A-10-262157 | 9/1998 |
| JP | A-11-187257 | 7/1999 |
| JP | A-2002-084434 | 3/2002 |
| JP | A-2009-130846 | 6/2009 |

\* cited by examiner

*Primary Examiner* — Duy M Dang
(74) *Attorney, Agent, or Firm* — Oliff & Berridge, PLC

(57) ABSTRACT

A color processing apparatus includes a memory, a color-difference-accuracy calculating unit, an invertibility-accuracy calculating unit, and an output unit. The memory stores a patch set including patch colors. The color-difference-accuracy calculating unit calculates, as a color-difference accuracy, a color difference between a measured color value, which corresponds to a target color, and a predicted value, which is predicted from the target color using a color conversion model generated from the patch set and measured color values corresponding to the patch colors. The invertibility-accuracy calculating unit calculates, as an invertibility accuracy, a difference between the target color and a predicted target color that is predicted from the predicted value using a model with which transformation is performed in a direction opposite to a direction of transformation using the color conversion model. The output unit outputs the color-difference accuracy and the invertibility accuracy.

11 Claims, 12 Drawing Sheets

| C | M | Y | K |
|---|---|---|---|
| 0 | 80 | 50 | 20 |
| 10 | 20 | 0 | 10 |
| 20 | 90 | 80 | 90 |
| ⋮ | ⋮ | ⋮ | ⋮ |
| 100 | 50 | 80 | 80 |

FIG. 3A

PATCH SET 1

| PATCH NO. | C | M | Y | K |
|---|---|---|---|---|
| 1 | 0 | 80 | 50 | 20 |
| 2 | 10 | 20 | 0 | 10 |
| 3 | 20 | 90 | 80 | 90 |
| ⋮ | ⋮ | ⋮ | ⋮ | ⋮ |
| 800 | 100 | 50 | 80 | 80 |

FIG. 3B

PATCH SET 2

| PATCH NO. | C | M | Y | K |
|---|---|---|---|---|
| 1 | 10 | 70 | 20 | 20 |
| 2 | 20 | 70 | 10 | 10 |
| 3 | 0 | 90 | 80 | 90 |
| ⋮ | ⋮ | ⋮ | ⋮ | ⋮ |
| 1000 | 50 | 50 | 60 | 80 |

FIG. 3C

PATCH SET 3

| PATCH NO. | C | M | Y | K |
|---|---|---|---|---|
| 1 | 0 | 50 | 50 | 20 |
| 2 | 40 | 20 | 0 | 10 |
| 3 | 100 | 30 | 70 | 90 |
| ⋮ | ⋮ | ⋮ | ⋮ | ⋮ |
| 1500 | 0 | 20 | 10 | 50 |

FIG. 6A

| Simulation of Selection of Patch Sets | | |
|---|---|---|
| Enter patch set for each pattern | Number of Patch Sets | 3 |
| Pattern 1 | Patch Set 1 | ▼ |
| Pattern 2 | Patch Set 2 | ▼ |
| Pattern 3 | Patch Set 3 | ▼ |

Select most suitable patch set using simulation?

[ OK ]  [ Cancel ]

FIG. 6B

Simulation Result (Degree of Suitability for Measured Color Value)

| | Average Color Difference | Maximum Color Difference | Invertibility Accuracy |
|---|---|---|---|
| Pattern 1 | 1.5 | 5.2 | 10.5 |
| Pattern 2 | 1.2 | 7.1 | 5.1 |
| Pattern 3 | 0.9 | 6.0 | 6.5 |

Which pattern of patch set do you select?

Pattern number that you selects  3

FIG. 9A
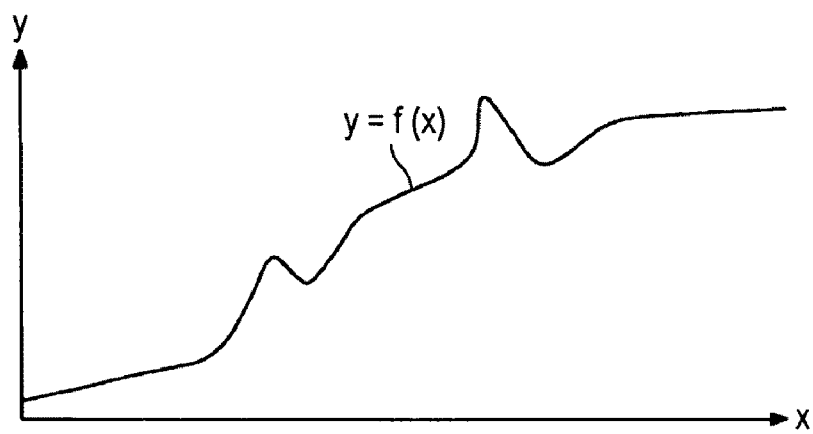
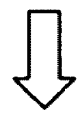
FIG. 9B
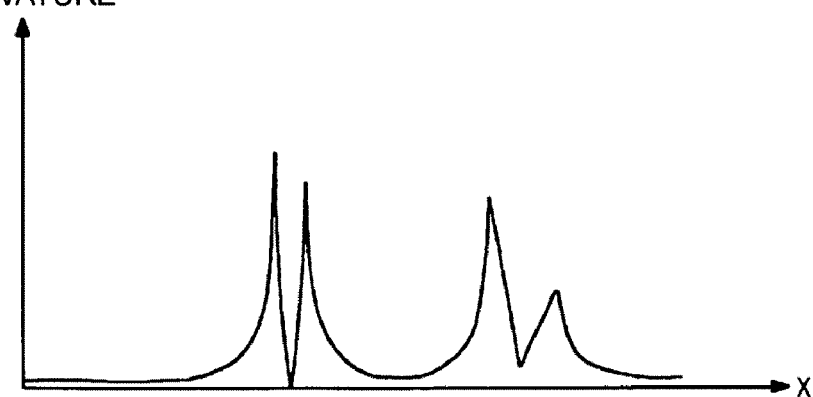

FIG. 11A
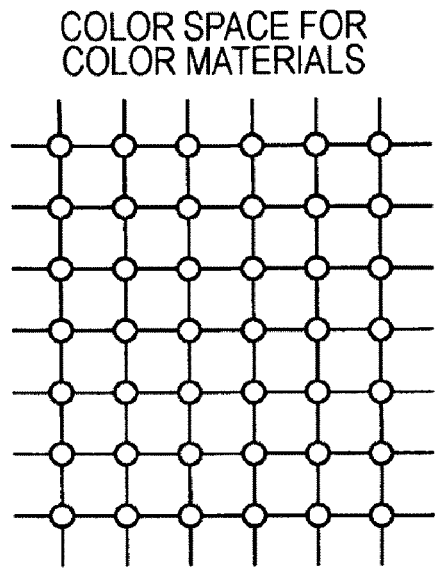
COLOR SPACE FOR COLOR MATERIALS
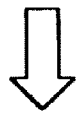
FIG. 11B
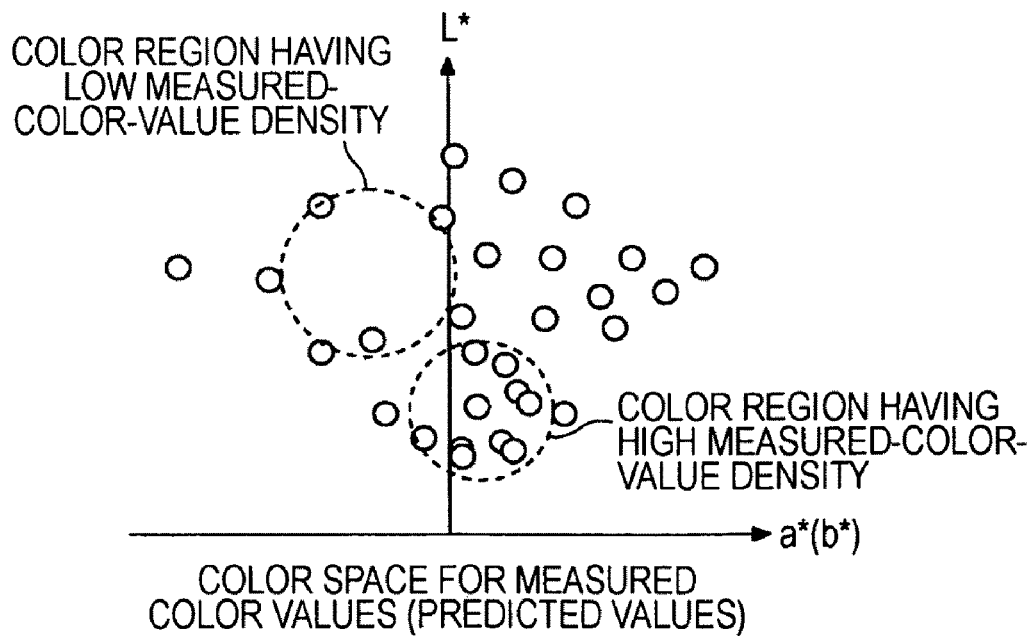

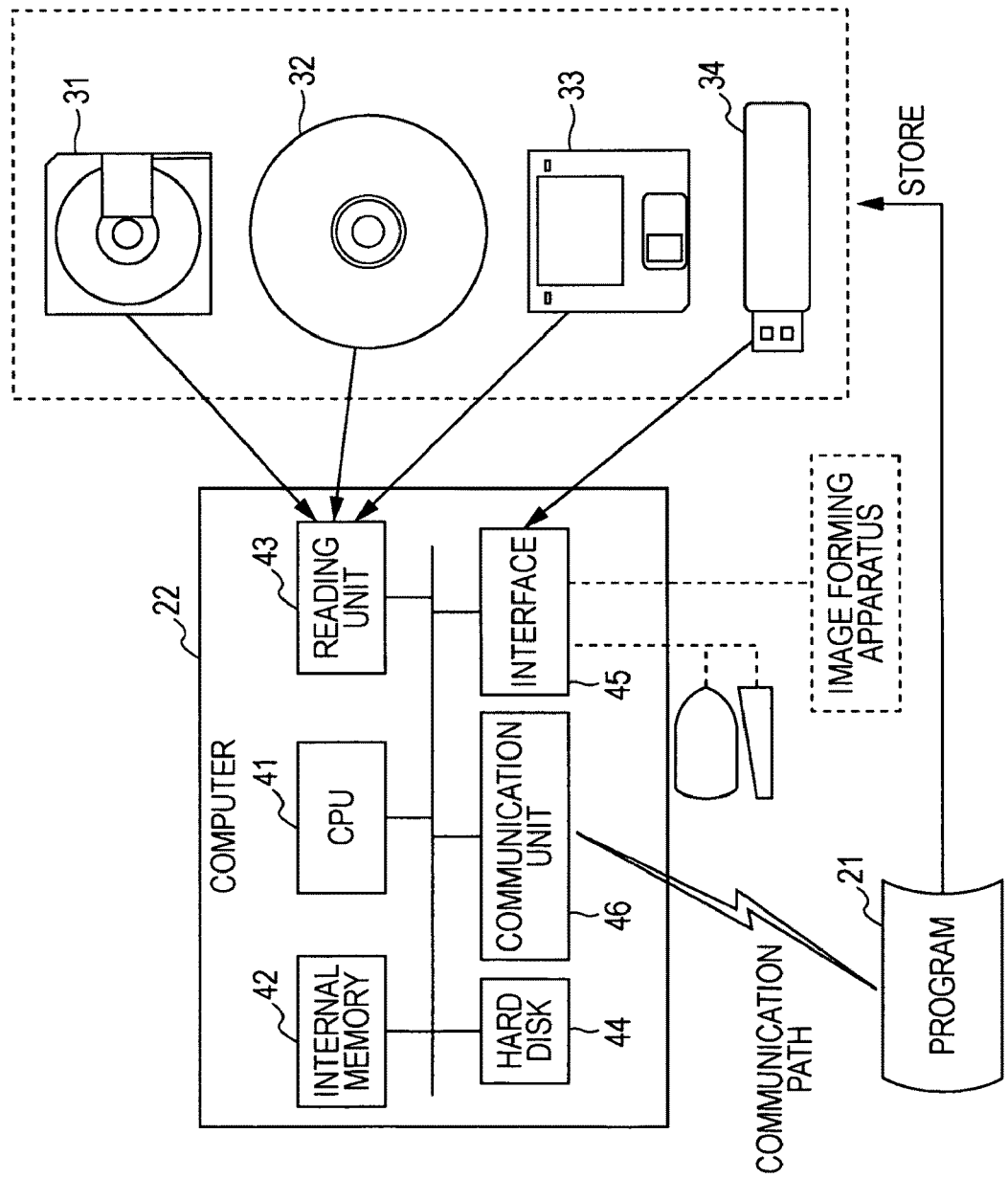

COLOR PROCESSING APPARATUS AND COMPUTER-READABLE MEDIUM STORING COLOR PROCESSING PROGRAM

CROSS-REFERENCE TO RELATED APPLICATIONS

This application is based on and claims priority under 35 USC 119 from Japanese Patent Application No. 2010-012378 filed Jan. 22, 2010.

BACKGROUND (i) Technical Field

The present invention relates to a color processing apparatus and a computer-readable medium storing a color processing program.

(ii) Related Art

In general, in color management systems (CMYs) or the like, in order to grasp the characteristics of an apparatus that handles color images, a patch set that is a set of multiple colors and measured color values corresponding to the individual colors are necessary. For example, in order to grasp the color output characteristics of an image output apparatus, values corresponding to individual colors included in a patch set are supplied to the image output apparatus. Measured color values corresponding to the individual colors are obtained by measuring colors that have been output. In a case of an image reading apparatus, individual colors included in a patch set are printed and measured to obtain measured color values. A printed material is read by the image reading apparatus, and values corresponding to individual colors that have been output from the image reading apparatus and the measured color values are associated with each other.

The degree of accuracy of the obtained characteristics of an apparatus increases with the number of colors that are prepared as colors to be included in a patch set. However, efforts to measure the colors increase. Furthermore, also when the input/output characteristics of an apparatus is subjected to modeling, thereby obtaining a model, it takes time to configure the model. Thus, the number of colors that are to be included in a patch set is limited.

For example, in a case of an image output apparatus, combinations of values that are obtained at predetermined steps for individual color elements of color materials or display colors which are used in the image output apparatus may be used as colors that are to be included in a patch set. However, the input/output characteristics of an apparatus in each portion of a color space vary. Even when the characteristics of the apparatus are obtained using colors included in a patch set, the apparatus does not necessarily have the same characteristics for the other colors. Thus, a case is supposed, in which a patch set is configured using the above-described combinations of simple values, in which the input/output characteristics of an apparatus is obtained to generate a color conversion model, and in which a color that is to be output from the apparatus is predicted. In such a case, a prediction accuracy, i.e., an error between a color that is output in reality when a certain color is supplied to the apparatus and a predicted value, differs depending on the color. For example, if a color belonging to a color region in which a provided prediction accuracy has not been obtained as the prediction accuracy is included in a patch set, the prediction accuracy in the color region is improved. In contrast, even when a certain color is removed from the patch set, the prediction accuracy does not change much. Accordingly, the prediction accuracy differs depending on which color is to be selected among the limited number of colors. Furthermore, there is also a case in which gradation is considered, in addition to the prediction accuracy. Colors constituting a patch set differ also depending on what type of design policy is employed.

As described above, it is difficult to simply determine colors that are to be included in a patch set. Thus, various proposals have been made as technologies for configuring patch sets. However, there is also a case in which a patch set is finally determined using intuition and experience of developers.

Generation of a patch set on the basis of experience of developers is limited. Furthermore, it is necessary to select and use a patch set with the knowledge of the degree of suitability of a patch set that has been generated in a certain manner for a corresponding apparatus or with the knowledge of which patch set among patch sets that have been generated in some manners is suitable for the apparatus. As a matter of course, although a reference patch set that is typically used may be used, there is no guarantee that the reference patch set is the most suitable patch set.

SUMMARY

According to an aspect of the invention, there is provided a color processing apparatus including a memory, a color-difference-accuracy unit, an invertibility-accuracy calculating unit, and an output unit. The memory stores a patch set including multiple patch colors. The color-difference-accuracy calculating unit calculates a color difference between a measured color value and a predicted value as a color-difference accuracy. The measured color value corresponds to a target color that has been set in advance. The predicted value is predicted from the target color using a color conversion model that has been generated from the patch set and measured color values corresponding to the multiple patch colors included in the patch set. The invertibility-accuracy calculating unit calculates a difference between a predicted target color and the target color as an invertibility accuracy. The predicted target color is predicted, using a model with which transformation is performed in a direction opposite to a direction of transformation using the color conversion model, from the predicted value that has been calculated from the target color using the color conversion model. The output unit outputs the color-difference accuracy and the invertibility accuracy.

BRIEF DESCRIPTION OF THE DRAWINGS

Exemplary embodiments of the present invention will be described in detail based on the following figures, wherein:

FIGS. 3A to 3C are explanatory diagrams of specific examples of multiple patch sets;

FIGS. 6A and 68 are explanatory diagrams of an example of selection of patch sets and output of accuracies;

FIGS. 9A and 9B are explanatory diagrams of an example of the curvature of a gradation that is calculated from changes in predicted target colors;

FIGS. 11A and 11B are explanatory diagrams of examples of predicted-value densities or measured-color-value densities; and FIG. 12 is an explanatory diagram of an example of a computer program, storage media storing the computer program, and a computer in a case in which the functions described in each of the individual exemplary embodiments of the present invention are implemented by the computer program.

DETAILED DESCRIPTION

Figure 1:
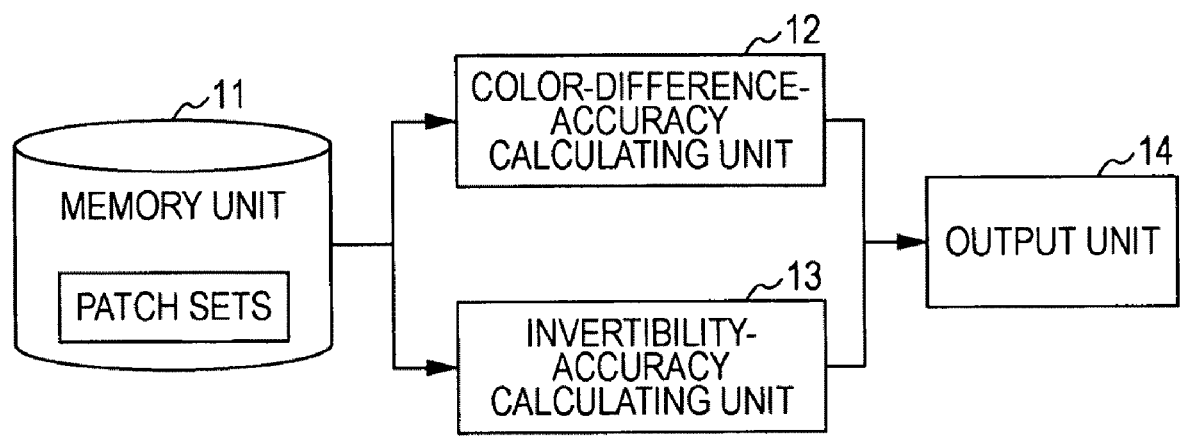
FIG. 1 is a configuration diagram illustrating a first exemplary embodiment of the present invention.

FIG. 1 is a configuration diagram illustrating a first exemplary embodiment of the present invention. A memory unit 11 stores one patch set or multiple patch sets, and each patch set includes multiple patch colors.

A color-difference-accuracy calculating unit 12 calculates a color-difference accuracy for a patch set stored in the memory unit 11. A color-difference accuracy is calculated as a color difference between a measured color value that corresponds to a target color which is set in advance and a predicted value that is predicted from the target color using a color conversion model. The color conversion model is a model that is generated from pairs of individual patch colors included in the patch set and measured color values corresponding to the individual patch colors, and may be generated using a commonly known technology. For example, there are various methods such as a method in which a neural network is caused to perform a learning process, a method in which a dot-area-ratio model using a Neugebauer's equation is utilized, a method in which characteristics are nonlinearly modeled by regression analysis (for example, methods described in Japanese Unexamined Patent Application Publications No. 10-262157 and No. 2002-84434), and a method in which interpolation using a weighted average is performed. Any of the various methods may be selected.

An invertibility-accuracy calculating unit 13 calculates an invertibility accuracy for the patch set stored in the memory unit 11. An invertibility accuracy is calculated as follows: a predicted value is calculated from a target color using the above-described color conversion model; a predicted target color is predicted from the predicted value using a model with which transformation is performed in a direction opposite to the direction of transformation using the color conversion model; and a difference between the predicted target color, which has been calculated, and the target color is calculated as an invertibility accuracy.

An output unit 14 outputs the color-difference accuracy, which has been calculated by the color-difference-accuracy calculating unit 12, and the invertibility accuracy, which has been calculated by the invertibility-accuracy calculating unit 13. Examples of the output manner include display output or print output for a user, data transfer utilizing a communication path, transmission of data to software or hardware, and so forth.

The first exemplary embodiment of the present invention will further be described using examples. Note that, in the below description, an image forming apparatus that forms an image on a medium using cyan (C), magenta (M), yellow (Y), and black (K) as color materials is supposed as an example of an apparatus that handles a color image. As a matter of course, which and how many color materials are used depends on an apparatus, and an image output apparatus other than the image forming apparatus, such as a display apparatus, may be supposed. Alternatively, an apparatus such as an image reading apparatus may be supposed.

Figures 2A, 2B:
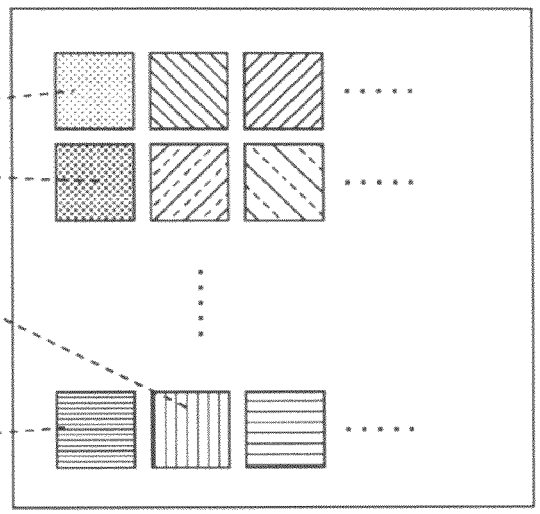
FIGS. 2A and 2B are explanatory diagrams of an example of a patch set and a color chart.

FIG. 2 includes explanatory diagrams of an example of a patch set and a color chart. A patch set includes multiple patch colors. Here, a patch color is defined as a combination of values corresponding to color materials that are used in the image forming apparatus. For example, as illustrated in FIG. 2A, a combination of C, M, Y, and K values, e.g., (0, 80, 50, 20), represents a patch color. A set of multiple patch colors is a patch set. Data regarding the patch set is stored in the memory unit 11 in advance. Note that, because the C, M, Y, and K values are dot-area ratios, typically, the C, M, Y, and K values are equal to or higher than 0% and are equal to or lower than 100%. Herein, it is also supposed that the C, M, Y, and K values are also in this range. In addition, as a case in which the C, M, Y, and K values are processed as digital signals, there may also be a case in which, for example, values that are equal to or higher than 0 and that are equal to or lower than 255 are used. Such a case may also be supposed.

The patch set is supplied to the image forming apparatus. A patch-set image in which colors corresponding to the individual patch colors are arranged is generated and formed on a medium by the image forming apparatus, thereby obtaining a color chart illustrated in FIG. 2B. The individual colors included in the color chart that has been obtained by the image forming apparatus are measured, thereby obtaining measured color values corresponding to the individual patch colors. The measured color values may be obtained in advance, and may be stored in the memory unit 11 so that the measured color values are associated with the respective patch colors included in the patch set.

FIGS. 3A to 3C are explanatory diagrams of specific examples of multiple patch sets. Multiple patch sets may be stored in the memory unit 11. Three types of patch sets, i.e., patch sets 1 to 3, are illustrated in FIGS. 3A to 3C, respectively. The patch sets are generated, for example, by making full use of intuition and experience of developers or know-how that a company has. It is supposed that the numbers of patch colors included in the individual patch sets are not the same. In this example, supposing that the patch set 1 illustrated in FIG. 3A includes 800 patches, the patch set 2 illustrated in FIG. 3B includes 1000 patches, and the patch set 3 illustrated in FIG. 3C includes 1500 patches, patch numbers (Nos.) are assigned to the individual patches.

Regarding each of the patch sets, a color conversion model is generated from pairs of the individual patch colors and the measured color values corresponding to the patch colors. As in the above-described example, supposing that patch colors are represented by CMYK values and measured color values are represented by L*a*b* values, a color conversion model in which the CMYK values and the L*a*b* values are associated with each other is generated. Color conversion from a CMYK value to an L*a*b* value is performed using the color conversion model.

The characteristics of the image forming apparatus that is targeted is reflected in the color conversion models that are generated from the patch sets. However, because each of the color conversion models is generated using discrete values, a case may occur, in which a color other than the patch colors is different from a color that is predicted from the color using the color conversion model. In order to know the characteristics of the color conversion models that are generated from the individual path sets, color-difference accuracies and invertibility accuracies are calculated in the first exemplary embodiment.

Figure 4A:
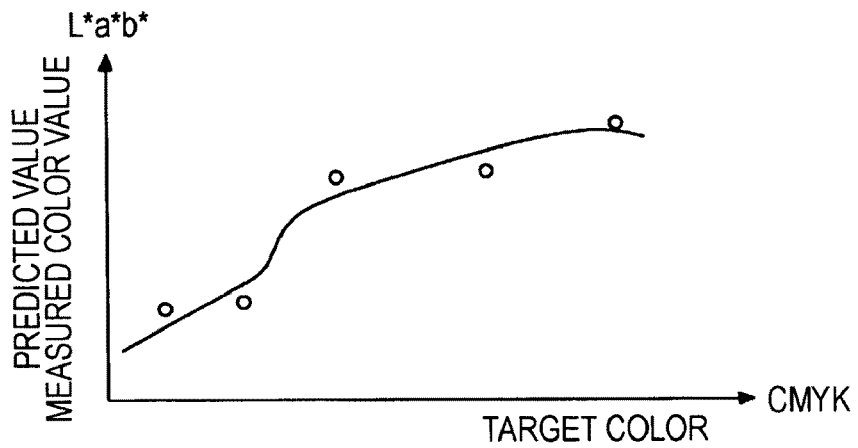
FIGS. 4A to 4C are graphs illustrating examples of measured color values and predicted values.
Figure 4B:
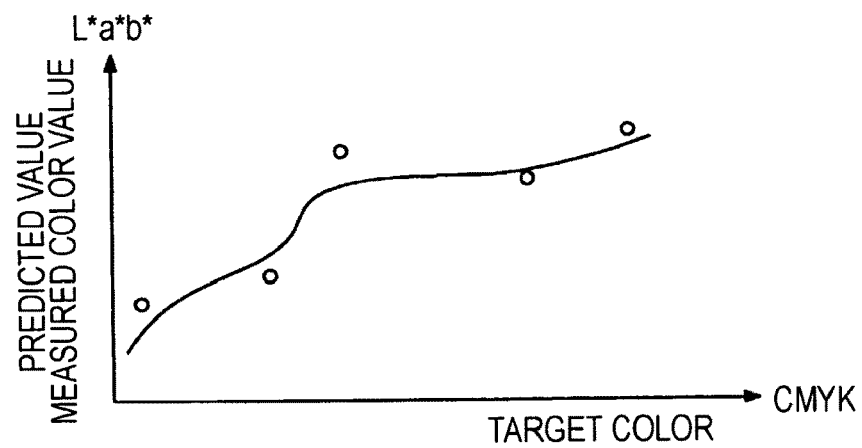
Figure 4C:
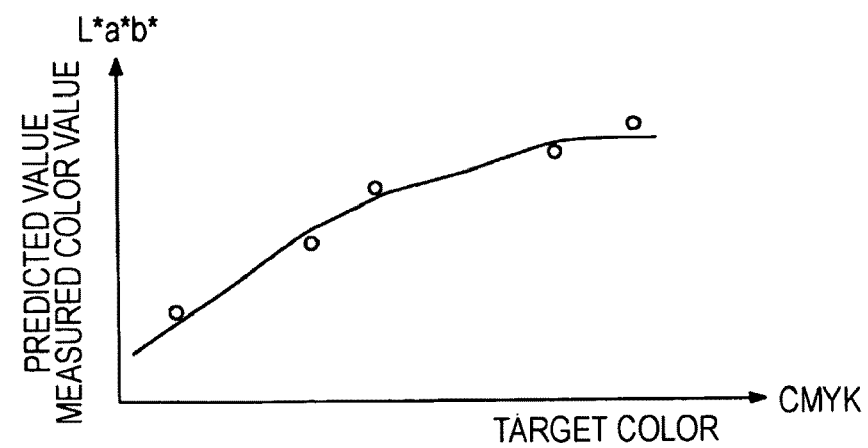

First, color-difference accuracies that are calculated by the color-difference-accuracy calculating unit 12 will be described. FIGS. 4A to 4C are graphs illustrating examples of measured color values and predicted values. Using the color conversion models that have been generated from the patch sets stored in the memory unit 11, target colors that are set in advance are subjected to color conversion to obtain predicted values. In FIGS. 4A to 4C, the tendencies of the predicted values are illustrated using curves. How the predicted values change differs with the patch sets. The tendencies of the predicted values corresponding to the three patch sets illustrated in FIGS. 3A to 3C are illustrated in FIGS. 4A to 4C, respectively. Furthermore, measured color values corresponding to the target colors are indicated by circles. Note that, in FIGS. 4A to 4C, the target colors are represented by CMYK values, and the measured color values and the predicted values are represented by L*a*b* values. The color conversion models are also supposed to be used to perform color conversion from a CMYK value to an L*a*b* value. Moreover, the patch colors, colors other than the patch colors, or combinations of the patch colors and colors other than the patch colors may be used as the target colors. For the measured color values corresponding to the target colors, the above-described method for obtaining measured color values corresponding to the patch colors may be used as it is. That is, the target colors may be supplied to the image forming apparatus that is targeted, an image may be formed, and colors included in the image may be measured.

Regarding each of the curves illustrated in FIGS. 4A to 4C, if the curve passes through one of the measured color values that are indicated by the circles, even when the target color corresponding to the measured color value is predicted using the color conversion model, a color that has been measured in reality to obtain the measured color value is reproduced as the target color. However, as illustrated in each of FIGS. 4A to 4C, there may be a case in which there are differences between the measured color values that correspond to the target colors and the predicted values that are predicted using the color conversion model. The color-difference-accuracy calculating unit 12 determines color differences between the measured color values and the predicted values. For example, the color-difference-accuracy calculating unit 12 calculates an average color difference, a standard deviation, and a maximum color difference as color-difference accuracies.

Next, invertibility accuracies that are calculated by the invertibility-accuracy calculating unit 13 will be described. As described above, using one of the color conversion models that have been generated from the patch sets, for example, when a target color is supplied, a predicted value is obtained. When color conversion is performed on the predicted value, which has been obtained, using a model with which transformation is performed in a direction opposite to the direction of transformation using the color conversion model, the target color is obtained in theory. For example, an L*a*b* value is predicted from a CMYK value using the color conversion model, and a CMYK value is obtained from the L*a*b* value, which is a predicted value, using the model with which transformation is performed in a direction opposite to the direction of transformation using the color conversion model.

In this example, when an L*a*b* value is predicted from a CMYK value using the color conversion model, because the color conversion model implements transformation from a four-dimensional value to a three-dimensional value, the L*a*b* value is uniquely determined. However, because the model for predicting a CMYK value from the L*a*b* value by a prediction process of performing inverse transformation implements transformation from a three-dimensional value to a four-dimensional value, the CMYK value is mathematically undefined. Accordingly, typically, a K value is determined from an L*a*b* value to obtain an L*a*b*K value, the L*a*b*K value is subjected to a prediction process of performing the inverse transformation to predict a CMY value from the L*a*b*K value, and a CMYK value is obtained. Regarding the K value, for example, a K value corresponding to a target color is used as the K value that is used for a prediction process of performing the inverse transformation. Alternatively, the K value may be set using a predetermined method. For example, the inverse transformation may be performed using a technology that is described in Japanese Unexamined Patent Application Publication No. 10-262157, No. 2002-84434, or the like. The original CMYK value is supposed to be obtained as a CMYK value corresponding to a predicted target color by a prediction process using the color conversion model and by the prediction process of performing the inverse transformation using the model with which transformation is performed in a direction opposite to the direction of transformation using the color conversion model. However, there is a case in which a CMYK value that corresponds to a predicted target color and that is different from the original CMYK value is obtained.

Figure 5:
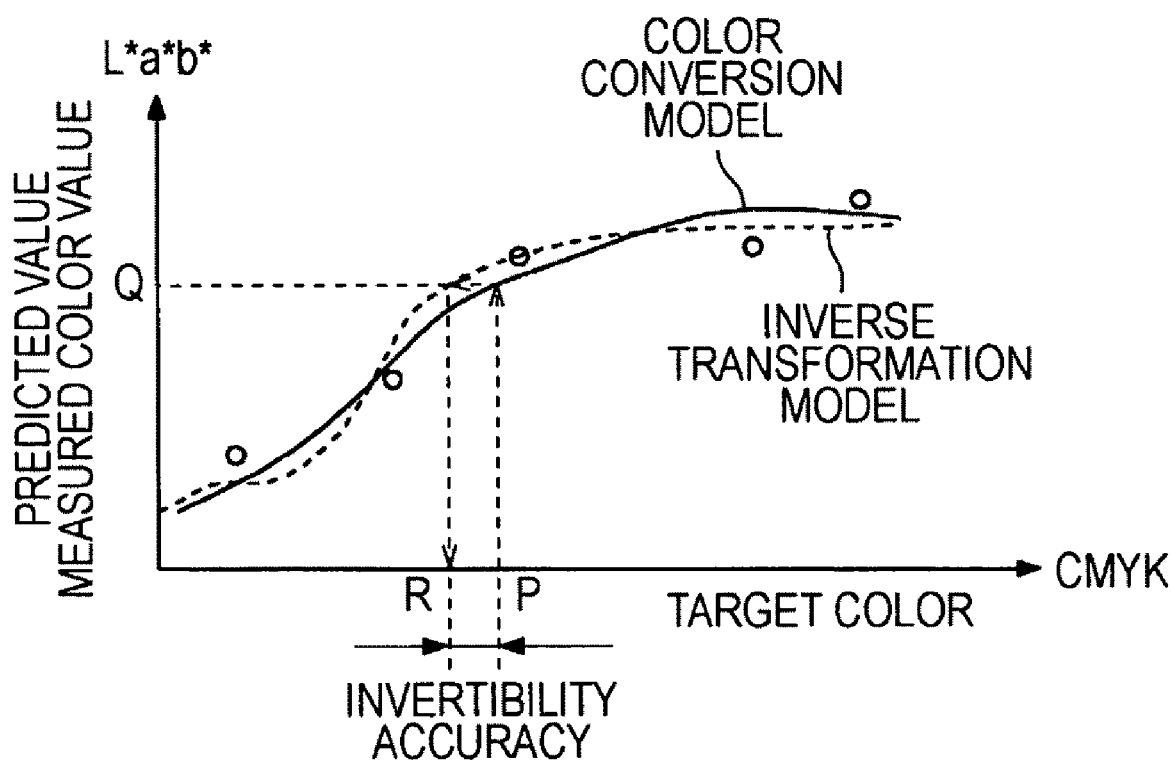
FIG. 5 is an explanatory diagram of an example of an invertibility accuracy.

FIG. 5 is an explanatory diagram of an example of an invertibility accuracy. In FIG. 5, the tendency of predicted values obtained using a color conversion model is indicated by the solid line. The tendency of CMYK values that correspond to predicted target colors and that are obtained using a model (inverse transformation model) with which transformation is performed in a direction opposite to the direction of transformation using the color conversion model is indicated by the broken line. For example, when a target color P is supplied, a predicted value obtained using the color conversion model is Q. When the predicted value Q is subject to the prediction process of performing the inverse transformation using the inverse transformation model, a predicted target color R is obtained. The predicted target color R, which has been obtained, is supposed to be the target color P. However, as in the example illustrated in FIG. 5, there is a case in which the predicted target color R different from the target color P is obtained. A color difference or a distance between the target color P and the predicted target color R may be calculated by the invertibility-accuracy calculating unit 13 as an invertibility accuracy. Note that, in a case in which a K value corresponding to a target color is used as it is when a predicted target color is obtained, a distance between a CMY value corresponding to the target color and a CMY value corresponding to the predicted target color may be calculated as an invertibility accuracy.

The color-difference accuracies that have been calculated by the color-difference-accuracy calculating unit 12 and the invertibility accuracies that have been calculated by the invertibility-accuracy calculating unit 13 in this manner are output from the output unit 14. FIGS. 6A and 6B are explanatory diagrams of an example of selection of patch sets and output of accuracies. An example of a display screen illustrated in FIG. 6A is a screen for selecting patch sets that are to be processed. In this example, a case in which the three patch sets stored in the memory unit 11, i.e., the patch sets 1 to 3, are selected is illustrated. Calculation of color-difference accuracies with the color-difference-accuracy calculating unit 12 and calculation of invertibility accuracies with the invertibility-accuracy calculating unit 13 are performed by operating an "OK" button in this screen.

In FIG. 6B, an example in which the output unit 14 displays and outputs the color-difference accuracies and the invertibility accuracies is illustrated. In this example, average color differences and maximum color differences as the color-difference accuracies are displayed side by side with the invertibility accuracies in a list form. Furthermore, "Pattern 1", "Pattern 2", and "Pattern 3" correspond to the patch sets 1 to 3 illustrated in FIG. 6A, respectively, in this example. Typically, when the invertibility accuracy is increased, the color-difference accuracy tends to decrease. For this reason, there is a tradeoff relationship between the invertibility accuracy and the color-difference accuracy. A patch set suitable for an application may be selected with reference to output values of the color-difference accuracy and the invertibility accuracy illustrated in FIG. 6B. In the example illustrated in FIG. 6B, "3" is displayed in a section of "Pattern number that you selects". A case in which the pattern 3, i.e., the patch set 3, is selected is illustrated. A patch set having a favorable invertibility accuracy is the pattern 2. However, the case is illustrated as an example in which a pattern is selected with consideration of the balance between the invertibility accuracy and the average color difference.

Note that the display forms are not limited to the display forms used in the examples of displays illustrated in FIGS. 6A and 6B, and, as a matter of course, the color-difference accuracies and the invertibility accuracies may be displayed in various types of display forms. Furthermore, as described above, the output manner in which the color-difference accuracies and the invertibility accuracies are output from the output unit 14 is not limited to display thereof. The color-difference accuracies and the invertibility accuracies may be output in various types of output manners. As one of the various types of output manners, a manner may be used, in which a patch set is automatically selected by passing data regarding the color-difference accuracies and the invertibility accuracies to a selection unit that selects a patch set and that is not illustrated, for example, by assigning weights to each of the color-difference accuracies and invertibility accuracies, and by performing determination.

Figure 7:
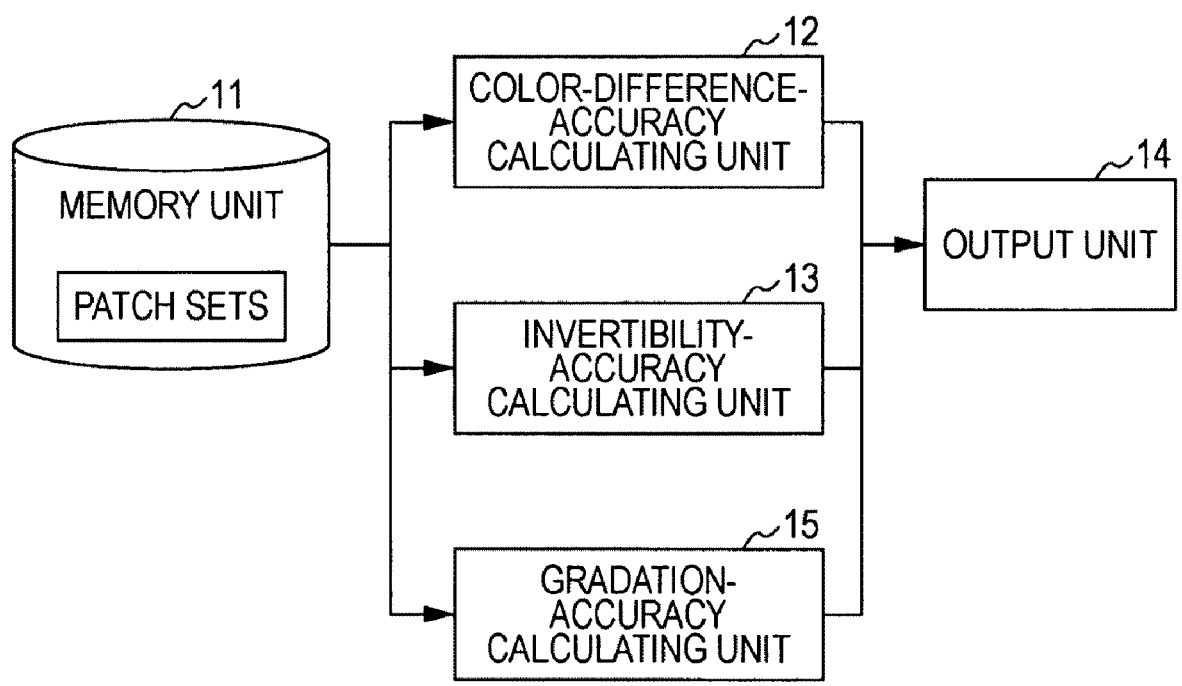
FIG. 7 is a configuration diagram illustrating a second exemplary embodiment of the present invention.

FIG. 7 is a configuration diagram illustrating a second exemplary embodiment of the present invention. The differences between the forgoing first exemplary embodiment and the second exemplary embodiment will be described. A gradation-accuracy calculating unit 15 calculates, as a gradation accuracy, a curvature of a gradation of predicted target colors that have been predicted by applying a model with which transformation is performed in a direction opposite to the direction of transformation using a color conversion model to continuous measured color values. The continuous measured color values may be provided in advance.

Furthermore, the output unit 14 also outputs the gradation accuracy that has been calculated by the gradation-accuracy calculating unit 15, together with a color-difference accuracy that has been calculated by the color-difference-accuracy calculating unit 12 and an invertibility accuracy that has been calculated by the invertibility-accuracy calculating unit 13.

Figure 8A:
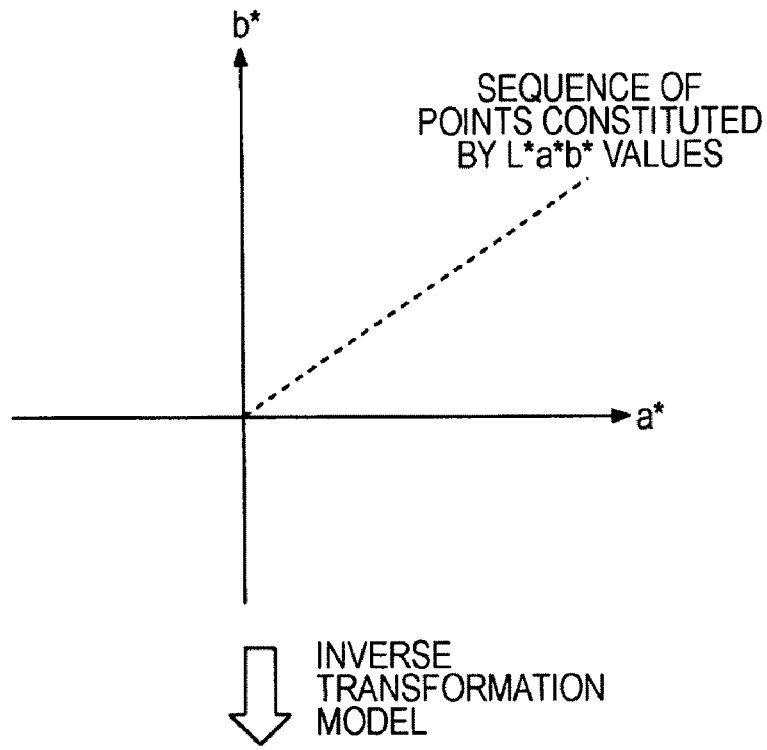
FIGS. 8A and 8B are explanatory diagrams of an example of changes in gradations that are obtained by a prediction process of performing inverse transformation.
Figure 8B:
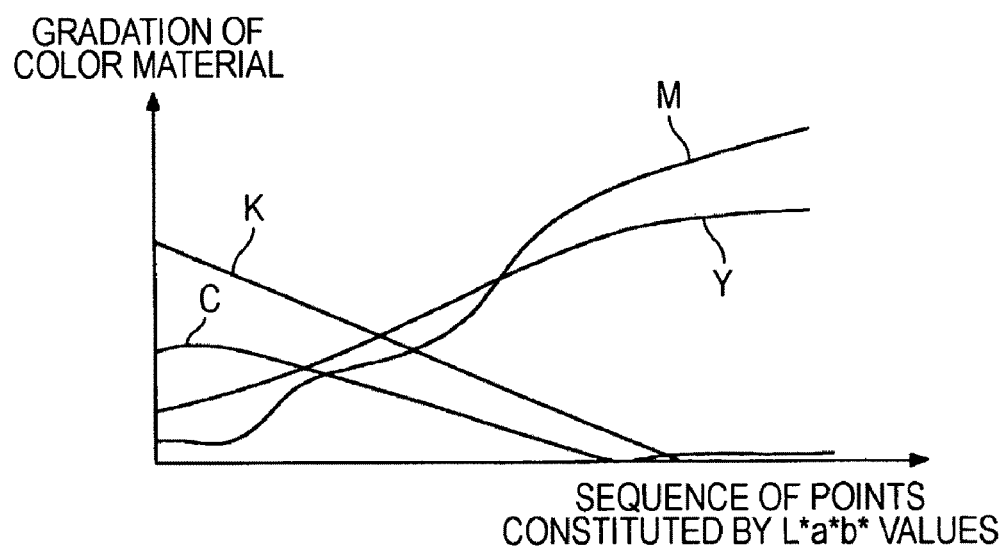

FIGS. 8A and 8B are explanatory diagrams of an example of changes in gradations that are obtained by the prediction process of performing inverse transformation. As in the example used in the first exemplary embodiment, patch colors are represented by CMYK values, and measured color values are represented by L*a*b* values. In this case, a color conversion model is a model with which color conversion from a CMYK value to an L*a*b* value is performed. A model (inverse transformation model) with which transformation is performed in a direction opposite to the direction of transformation using the color conversion model is a model with which color conversion from an L*a*b* value to a CMYK value. As continuous L*a*b* values, here, for example, it is supposed that a sequence of points indicated by the broken line illustrated in FIG. 8A is provided. More specifically, the sequence of points is obtained by fixing the brightness and changing the colorfulness in a hue of "red". As a matter of course, the brightness does not necessarily need to be fixed, and the hue does not necessarily need to be fixed. For example, a sequence of points which is provided in accordance with a scale with which a gradation accuracy should be calculated, such as a sequence of points that is obtained by changing the brightness or a sequence of points that is obtained by changing the hue, may be prepared.

Transformation using the inverse transformation model is performed on the sequence of points constituted by L*a*b* values to obtain CMYK values. As described above, because this transformation is transformation from a three-dimensional value to a four-dimensional value, K values are determined using a predetermined method. CMY values are obtained from L*a*b*K values. For example, various methods, such as a method in which a K value is defined as a fixed value, a method in which a K value is defined as a value determined from an L* value, and a method in which a K value is defined as a value that decreases with an increase in the colorfulness as illustrated in FIG. 8B, may be used.

In FIG. 8B, regarding the CMYK values that have been obtained using the inverse transformation model from the sequence of points constituted by L*a*b* values and that correspond to predicted target colors, examples of changes in gradations of the individual color elements are illustrated. As described above, regarding K, the gradation thereof decreases with an increase in the colorfulness. Among C, M, and Y, regarding M and Y, which are color elements of color materials for reproducing "red", the gradations thereof increase with an increase in the colorfulness. Regarding C, the gradation thereof decreases with an increase in the colorfulness. However, the tendencies of increases and decreases in the gradations are different from one another. For example, a rate of an increase in the gradation of M changes by a large amount, compared with the tendencies of changes in the gradations of the other color elements. The gradation-accuracy calculating unit 15 quantifies the tendencies of changes in the gradations.

FIGS. 9A and 9B are explanatory diagrams of an example of the curvature of a gradation that is calculated from changes in values corresponding to the predicted target colors. FIG. 9A illustrates an example of a gradation of a certain color element illustrated in FIG. 8B. Regarding the certain color element, the gradation thereof is represented as a function. In this example, when the colorfulness is denoted by x and the gradation of the certain color element is denoted by y, the relationship therebetween is represented by a function $y=f(x)$. Typically, the curvature $\alpha(x)$ of this function is represented using the following second-order differential format.

$$\alpha(x)=f''(x)/(1+f'(x)^2)^{3/2}$$

The curvature, which is changing, of the function illustrated in FIG. 9A is illustrated in FIG. 9B.

Referring to FIGS. 9A and 9B, regarding values of x where y sharply changes in FIG. 9A, values of the curvature corresponding to the values of x illustrated in FIG. 9B are larger than values of the curvature corresponding to other values of x. Accordingly, regarding a value of x where y changes by a large amount, the value of the curvature corresponding to the value of x increases. Thus, the average value or the maximum value of the curvature may be calculated and determined as a gradation accuracy.

Note that, for example, when the output unit 14 performs the display and output illustrated in FIG. 6B, gradation accuracies may be displayed side by side with the color-difference accuracies and the invertibility accuracies. As a matter of course, the display form is not limited to one of the display forms used in the examples illustrated in FIGS. 6A and 6B, and the output manner in which the gradation accuracies are output is not limited to display thereof.

Figure 10:
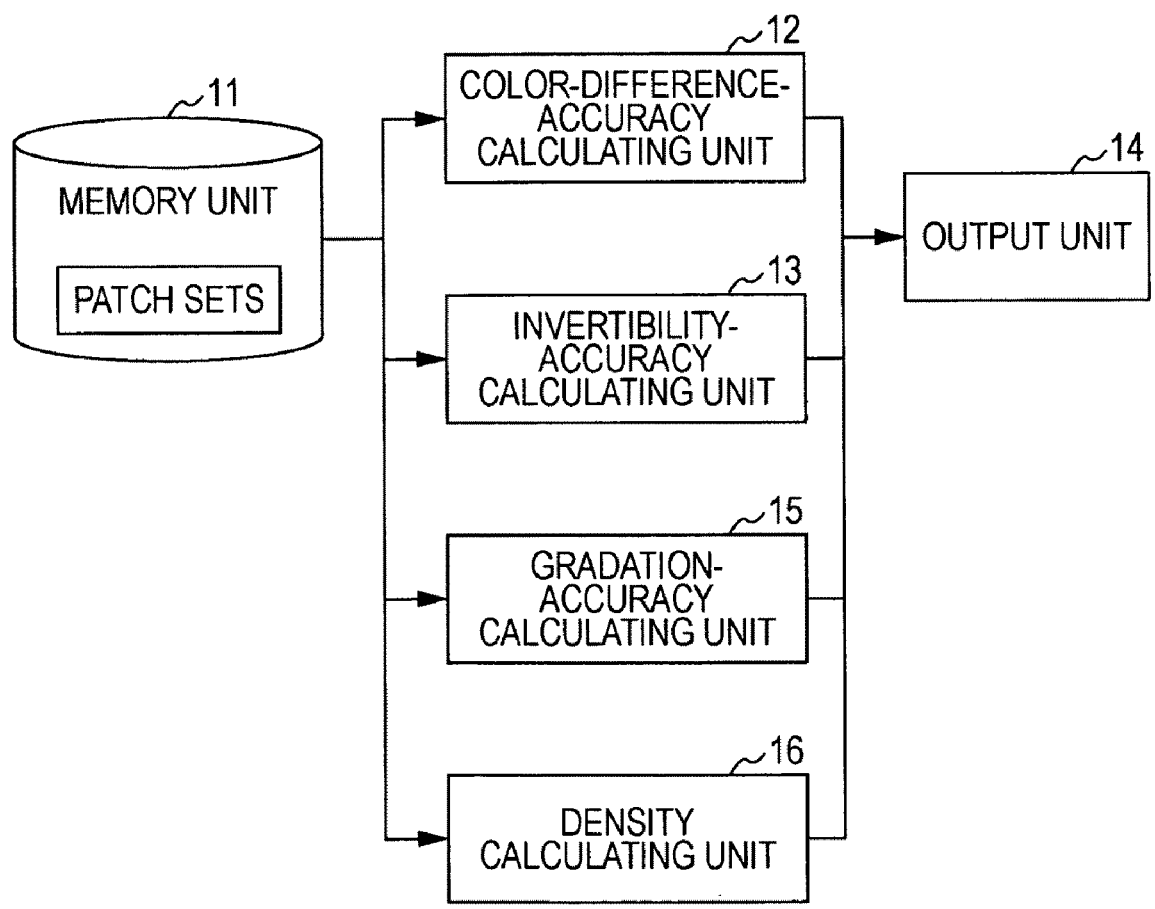
FIG. 10 is a configuration diagram illustrating a third exemplary embodiment of the present invention.

FIG. 10 is a configuration diagram illustrating a third exemplary embodiment of the present invention. The differences between the forgoing first exemplary embodiment and the third exemplary embodiment will be described. A density calculating unit 16 calculates a predicted-value density associated with predicted values that are obtained by converting individual patch colors included in a patch set using a color conversion model or a measured-color-value density associated with measured color values corresponding to the patch colors.

Furthermore, the output unit 14 also outputs the predicted-value density or the measured-color-value density, which has been calculated by the density calculating unit 16, together with a color-difference accuracy that has been calculated by the color-difference-accuracy calculating unit 12, an invertibility accuracy that has been calculated by the invertibility-accuracy calculating unit 13, and a gradation accuracy that has been calculated by the gradation-accuracy calculating unit 15.

Note that, although an example in which the density calculating unit 16 is provided in the configuration according to the second exemplary embodiment illustrated in FIG. 7 is described, a configuration in which the density calculating unit 16 is provided in the configuration according to the first exemplary embodiment illustrated in FIG. 1 may be used.

FIGS. 11A and 11B are explanatory diagrams of examples of predicted-value densities or measured-color-value densities. FIG. 11A illustrates an example of arrangement, in a color space for patch colors, of the individual patch colors. For convenience of illustration, the arrangement is illustrated as a two-dimensional arrangement. Circles illustrated in FIG. 11A indicate the patch colors included in a patch set. In this example, in the color space for the patch colors, the individual patch colors are arranged at predetermined intervals. In this case, there is no change in patch-color density in the color space for the patch colors. However, when predicted values that are obtained by converting the patch colors using a color conversion model or measured color values that correspond to the patch colors are arranged in the color space for the predicted values or the measured color values, for example, the arrangement is provided as illustrated in FIG. 11B. In FIG. 11B, the color space for the predicted values or the measured color values is considered as an L*a*b* color space, and illustrated as a certain two-dimensional plane including an L* axis. Note that circles illustrated in FIG. 11B indicate the predicted values or the measured color values.

Referring to FIG. 11B, a region having a predicted-value density or measured-color-value density that is lower than that of each of the other regions, and a region having a predicted-value density or measured-color-value density that is higher than that of each of the other regions exist. The reason for this is that a mapping from a color space to a color space has non-linear characteristics. For example, it is known that a dark region in which L* values are small has a high predicted-value density or measured-color-value density.

Regarding predicted-value densities or measured-color-value densities, the color space for the predicted values or the measured color values is divided into partial spaces at predetermined intervals along individual axes of the color space, and the numbers of predicted values or measured color values that are included in the individual divided partial spaces are calculated. Then, for example, values that are obtained by performing a statistical process on the numbers of predicted values or measured color values may be calculated as predicted-value densities or measured-color-value densities. For example, average numbers or standard deviations may be calculated as predicted-value densities or measured-color-value densities. Simply, information concerning the partial spaces in which the averages numbers are smaller than a predetermined number and the partial spaces in which the averages numbers are larger than a predetermined number may be output from the output unit 14. According to such information concerning predicted-value densities or measured-color-value densities, for example, some patch colors may be thinned out of patch colors included in regions in which the predicted-value densities or measured-color-value densities are higher than those in the other regions, and some patch colors may be added to regions in which the predicted-value densities or measured-color-value densities are lower than those in the other regions. A patch set that some patch colors are added/removed to/from may be provided as a new patch set. A patch set that has been used to generate a color conversion model may be reconfigured by reflecting the information concerning predicted-value densities or measured-color-value densities in the patch set.

Alternatively, in a color space for patch colors, pieces of data corresponding to the patch colors may be randomly generated to configure a patch set, and a color-difference accuracy, an invertibility accuracy, a predicted-value density or measured-color-value density, and so forth may be calculated. In this case, although the patch set is not generated for the sake of utilizing itself, the patch set may be utilized to grasp the input/output characterization of an apparatus that is targeted.

When an example is provided in each of the forgoing exemplary embodiments, an image forming apparatus that forms an image using color materials of CMYK is described by way of example. However, for example, also in a case of an image reading apparatus, indices may be calculated by individual units and may be output. In this case, the image reading apparatus may read a color chart, and may output signals having individual colors. Using the signals having individual colors, e.g., RGB values, as patch colors, a patch set may be constituted by the patch colors. The patch colors are associated with measured color values, i.e., L*a*b* values, that are obtained by measuring colors included in the color chart. A model with which transformation from an RGB value to an L*a*b* value is performed may be used as a color conversion model.

FIG. 12 is an explanatory diagram of an example of a computer program, storage media storing the computer program, and a computer in a case in which the functions described in each of the exemplary embodiments of the present invention are implemented by the computer program.

All or some of the functions of the individual units described in each of the foregoing exemplary embodiments of the present invention may be implemented by a computer-executable program 21. In this case, the program 21, data used in the program 21, and so forth may be stored in a computer-readable storage medium. The term "storage medium" means a medium that generates a state in which energy, such as magnetic energy, optical energy, or electrical energy, changes in accordance with the content written in a program, and that transmits the content written in the program to a reading unit 43 provided in a hardware resource of a computer 22 in the form of a signal corresponding to a change in the energy. Examples of the storage medium include a magneto-optical disk 31, an optical disk 32 (including a compact disk (CD) and a digital versatile disk (DVD)), a magnetic disk 33, and a memory 34 (including an integrated circuit (IC) card and a memory card). As a mater of course, the storage medium is not limited to a portable storage medium.

All or some of the functions described in each of the foregoing exemplary embodiments of the present invention are implemented by storing the program 21 in the storage medium, by placing the storage medium in, for example, the reading unit 43 or an interface 45 of the computer 22, by reading the program 21 with the computer 22, by storing the program 21 in an internal memory 42 or a hard disk 44, and by executing the program 21 with a central processing unit (CPU) 41. Alternatively, all or some of the functions described in each of the foregoing exemplary embodiments of the present invention may be implemented by transferring the program 21 to the computer 22 via a communication path, by receiving the program 21 with a communication unit 46 in the computer 22, by storing the program 21 in the internal memory 42 or the hard disk 44, and by executing the program 21 with the CPU 41.

The computer 22 may be connected to other various apparatuses via the interface 45. For example, a display that displays information and a receiver that receives information from a user may also be connected to the computer 22. Furthermore, for example, the computer 22 may be configured to cause the display to display the display screens illustrated in FIGS. 6A and 6B, and configured to receive an operation performed by a user with the receiver. Furthermore, the memory unit 11 may be configured using the magnetic disk 33, an external memory that is connected to the interface 45, or an external apparatus with which communication unit 46 communicates via the communication path.

Furthermore, for example, the image forming apparatus serving as an image output apparatus is connected to the computer 22 via the interface 45. The computer 22 may be configured to output a color chart, or configured to form an image that has been subjected to color conversion using a color conversion model which has been generated using a patch set selected in accordance with various types of indices. Note that individual configurations may not necessarily be implemented as operations that are performed by a single computer, and individual processes may be performed by different computers in accordance with the processes.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color processing apparatus comprising:
    a memory that stores a patch set including a plurality of patch colors;
    a color-difference-accuracy calculating unit that calculates a color difference between a measured color value and a predicted value as a color-difference accuracy, the measured color value corresponding to a target color that has been set in advance, the predicted value being predicted from the target color using a color conversion model that has been generated from the patch set and measured color values corresponding to the plurality of patch colors included in the patch set;
    an invertibility-accuracy calculating unit that calculates a difference between a predicted target color and the target color as an invertibility accuracy, the predicted target color being predicted, using a model with which transformation is performed in a direction opposite to a direction of transformation using the color conversion model, from the predicted value that has been calculated from the target color using the color conversion model; and
    an output unit that outputs the color-difference accuracy and the invertibility accuracy.

2. The color processing apparatus according to claim 1, further comprising a gradation-accuracy calculating unit that calculates a curvature of a gradation of predicted target colors as a gradation accuracy, the predicted target colors being predicted from continuous measured color values using the model with which transformation is performed in the direction opposite to the direction of transformation using the color conversion model,
    wherein the output unit further outputs the gradation accuracy.

3. The color processing apparatus according to claim 1, further comprising a density calculating unit that calculates a predicted-value density associated with predicted values which have been obtained by converting the plurality of patch colors included in the patch set using the color conversion model or a measured-color-value density associated with the measured color values corresponding to the plurality of patch colors,
    wherein the output unit further outputs the predicted-value density or the measured-color-value density.

4. The color processing apparatus according to claim 2, further comprising a density calculating unit that calculates a predicted-value density associated with predicted values which have been obtained by converting the plurality of patch colors included in the patch set using the color conversion model or a measured-color-value density associated with the measured color values corresponding to the plurality of patch colors,
    wherein the output unit further outputs the predicted-value density or the measured-color-value density.

5. The color processing apparatus according to claim 1, further comprising a generating unit that generates a plurality of patch sets including a plurality of patch colors which have been randomly extracted, and that causes the memory to store the plurality of patch sets.

6. The color processing apparatus according to claim 2, further comprising a generating unit that generates a plurality of patch sets including a plurality of patch colors which have been randomly extracted, and that causes the memory to store the plurality of patch sets.

7. The color processing apparatus according to claim 3, further comprising a generating unit that generates a plurality of patch sets including a plurality of patch colors which have been randomly extracted, and that causes the memory to store the plurality of patch sets.

8. A non-transitory computer-readable medium storing a color processing program that causes a computer to execute a function of the color processing apparatus according to claim 1.

9. A non-transitory computer-readable medium storing a color processing program that causes a computer to execute a function of the color processing apparatus according to claim 2.

10. A non-transitory computer-readable medium storing a color processing program that causes a computer to execute a function of the color processing apparatus according to claim 3.

11. A non-transitory computer-readable medium storing a color processing program that causes a computer to execute a function of the color processing apparatus according to claim 5.

* * * * *